United States Patent [19]

Maekawa

[11] 4,349,994
[45] Sep. 21, 1982

[54] WEATHER STRIP ASSEMBLY FOR VEHICLE WINDOW

[75] Inventor: Tadashi Maekawa, Aichi, Japan

[73] Assignee: Aisin Seiki Kabushiki Kaisha, Kariya, Japan

[21] Appl. No.: 208,396

[22] Filed: Nov. 19, 1980

[30] Foreign Application Priority Data

Nov. 19, 1979 [JP] Japan .................... 54-160169[U]

[51] Int. Cl.³ .................... B60R 27/00; E06B 7/098
[52] U.S. Cl. .................... 52/208; 52/400; 428/122; 428/358
[58] Field of Search .................... 428/31, 122, 358; 49/490, 491; 52/400, 716, 208

[56] References Cited

U.S. PATENT DOCUMENTS

| | | | |
|---|---|---|---|
| 2,056,024 | 9/1936 | Stuart | 52/400 |
| 2,549,315 | 4/1951 | Kramer | 52/400 X |
| 2,610,714 | 9/1952 | Bradley | 52/400 |
| 2,612,972 | 10/1952 | Heimgartner et al. | 52/716 X |
| 2,654,919 | 10/1953 | Marvin | 52/403 X |
| 2,814,525 | 11/1957 | Thomas | 52/400 X |
| 3,189,143 | 6/1965 | Adams | 52/400 X |
| 3,338,007 | 8/1967 | Draplin | 52/400 X |
| 3,705,470 | 12/1972 | Kent | 52/400 X |
| 3,714,751 | 2/1973 | Lackey | 52/400 |
| 3,766,697 | 10/1973 | Jackson | 52/400 X |
| 3,851,432 | 12/1974 | Griffin | 52/400 |
| 3,959,941 | 6/1976 | Smith | 52/400 |

FOREIGN PATENT DOCUMENTS

| | | | |
|---|---|---|---|
| 997129 | 6/1965 | United Kingdom | 428/83 |
| 1210421 | 10/1970 | United Kingdom | 428/83 |
| 1214057 | 12/1970 | United Kingdom | . |
| 1230894 | 5/1971 | United Kingdom | . |

Primary Examiner—Henry F. Epstein
Attorney, Agent, or Firm—Finnegan, Henderson, Farabow, Garrett & Dunner

[57] ABSTRACT

A weather strip assembly for a vehicle window including a weather strip or moulding and a holder. The weather strip is inserted into a gap between a window glass to which the holder is attached and the body of the vehicle. The weather strip has a hat-shaped head portion to partly cover the window glass and the body of the vehicle and a leg portion adapted to be urged against the vehicle body and to be embedded in a bonding agent. The holder has a resiliently reformable elongation which functions to force the leg portion toward the body. The weather strip assembly further may include a member for determining a proper position of the weather strip with respect to the window glass and the vehicle body.

5 Claims, 4 Drawing Figures

WEATHER STRIP ASSEMBLY FOR VEHICLE WINDOW

The present invention relates to weather strip assemblies for vehicle windows, and more particularly to improved weather strips for vehicle windows attached between side edges of openings formed in body members of the vehicles and side edges of the window glasses held in the openings.

In order to provide a sealing effect between a window glass and an opening defined in a body of the vehicle, a plastic weather strip or moulding has been inserted therebetween. In the prior art, an exact gap between the side edges of the opening and the window glass is required to obtain a desirable sealing effect therebetween, since any larger gap causes the weather strip to make an insufficient contact with the side edges of the window glass and of the opening when the strip is inserted into the gap between them. It will be clear that this situation has an adverse effect on the sealing effect between the opening of the body and the window glass. Accordingly, the window glass and the opening of the vehicle body in the prior art have to be manufactured accurately and at increased cost.

It is therefore an object of the present invention to provide a weather strip assembly for a window glass suitable to be used in a vehicle and adapted to be inserted into a space between side edges of the window glass and an opening in the vehicle body.

Another object of the present invention is to provide a weather strip assembly for a window glass having a high sealing effect and including a weather strip and a holder secured to side edges of the window glass.

According to the present invention, the above and other objects can be accomplished by a weather strip assembly comprising a weather strip and a holder secured to the edge of the window glass. The weather strip has a head portion, adapted to overlay a portion of the outer surface of the body of the vehicle and the outer surface of a window glass held in an opening formed in the vehicle body, and a leg portion integrally formed with the head portion and having an anchor-shaped end, the leg portion being inserted into a gap between the side edges of the opening and the window glass and the anchor-shaped end thereof being adapted to be embedded in a bonding agent put into a space between the window glass and the vehicle body. The holder has an elastic elongation engageable with the leg portion of the weather strip.

According to another aspect of the present invention, on an outer surface of the leg portion of the weather strip is formed a groove, and the holder is provided with a tongue disposed in the direction of the groove so that the tongue engages the groove when the weather strip is mounted. According to a further aspect of the present invention, the body is provided with a member having a raised portion engageable with a groove formed on an inner surface of the leg portion of the weather strip so as to facilitate the determination of a proper position of the leg portion when the weather strip is mounted.

The above and other objects and features of the present invention will become apparent from the following description of preferred embodiments with reference to the accompanying drawings, in which.

Figure 1:
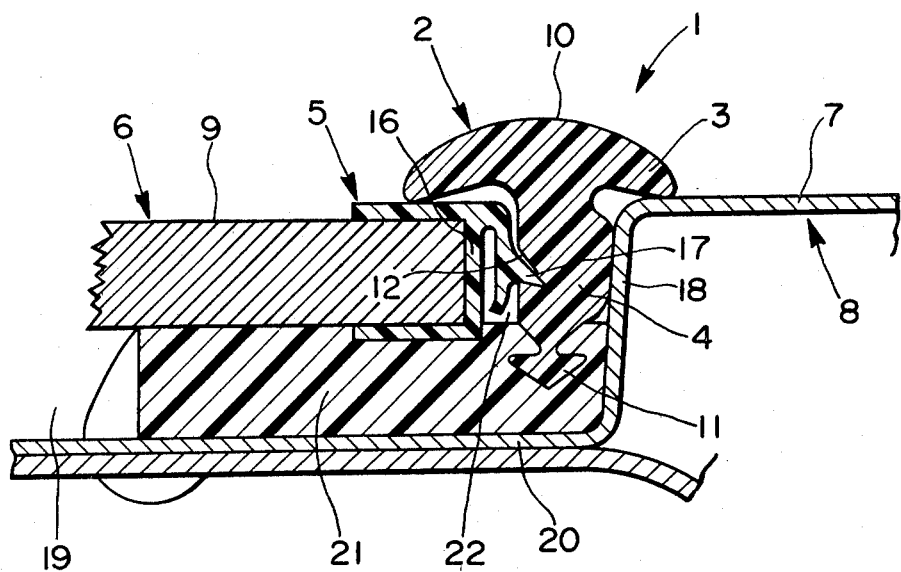
FIG. 1 is a sectional view showing an installation of a weather strip assembly according to one embodiment of the present invention.

Referring to FIG. 1, a weather strip assembly 1 includes a weather strip 2 having a head portion 3 and a leg portion 4 integrally formed with the head portion 2, and a holder 5 secured to a window glass 6 of a vehicle. The head portion 3 of the weather strip 2 has dimensions sufficient to overlay a portion of the outer surface 7 of a body 8 of the vehicle and of the outer surface 9 of the window glass 6, and is preferably formed into a hat shape or anchor shape so as to provide a smoothly rounded outer surface 10 between the body 8 and the window glass 6. The leg portion 4 is fashioned into an anchor-shaped end 11 and is provided with a groove 12 formed on its middle portion on the surface thereof which opposes the window glass 6.

Figure 2:
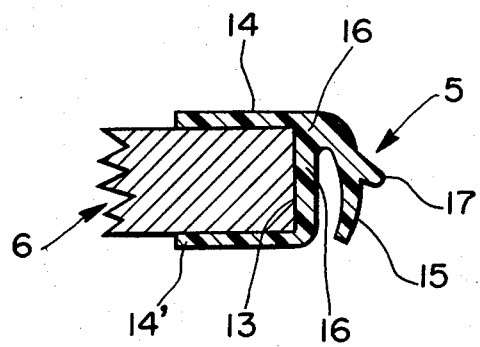
FIG. 2 is a sectional view showing a holder secured to an edge of a window glass according to the embodiment of FIG. 1.

Referring to FIGS. 1 and 2, the holder 5 has a U-shaped channel 13 defined by opposed side walls 14, 14' so as to tightly receive therein a side edge of the window glass 6. An elongation 15 extends outwardly from a base wall 16 of the holder 5 toward the side wall 18 of the vehicle body 8. The elongation 15 is resiliently deformable toward the base wall 16 of the holder 5, and is further provided on its surface which faces the side wall 18 of the vehicle body 8 with a tongue 17. The resilient force of the elongation 15 urges the leg portion 4 of the weather strip 2 toward and into contact with the side wall 18 of the vehicle body 8.

The window glass 6 being gripped by the holder 5 is placed in an opening 19 of the vehicle body 8 against flange 20 of the vehicle body 8 on which a bonding agent 21 has been poured or coated. The window glass 6 is secured to the body 8 through the bonding agent 21 in such a manner as to leave a gap 22 between a side edge of the window glass 6 and the side wall 18 of the body 8. The weather strip 2 is inserted into the gap 22 before solidification of the bonding agent 21, so that the head portion 3 of the weather strip 2 partly overlays the external surface 7 of the vehicle body 8 and the external surface 9 of the window glass 6 which is gripped within the holder 5. The anchor-shaped end 11 of the leg portion 4 is embedded in the bonding agent 21, and the tongue 17 of the holder 5 is engaged with the groove 12 of the leg portion 4. The resilient elongation 15 urges the leg portion 4 against the body wall 18, so that the weather strip 2 is firmly secured between the window glass 6 and the body 8 to provide a preferable sealing effect after solidification of the bonding agent 21.

Figure 3:
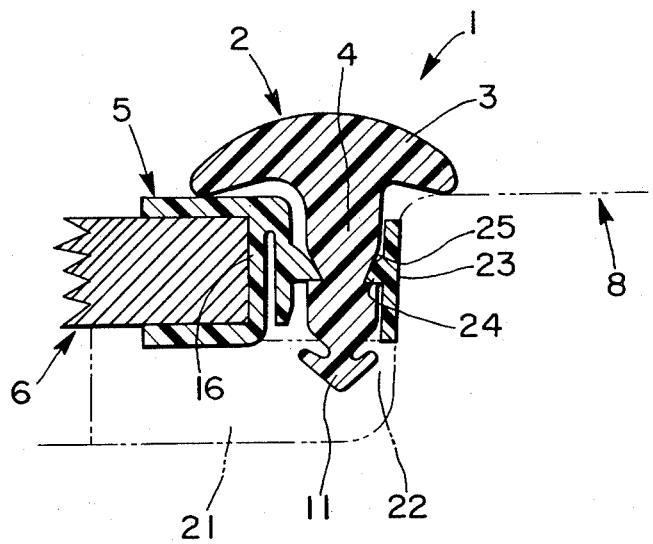
FIG. 3 is a sectional view showing a weather strip assembly according to another aspect of the present invention.
Figure 4:
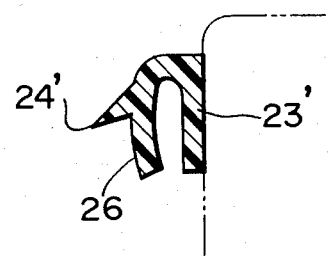
FIG. 4 is a sectional view showing a member for determining a position of the weather strip, which member is secured to a body of a vehicle.

Referring to FIG. 3, a member 23 for determining a proper position of the weather strip 2 with respect to the window glass 6 and the body 8 is secured to the body 8 at a position opposed to that to be assumed by the edge of the window glass 6. The member 23 has a projection 24 which is engageable with a groove 25 formed on that surface of the leg portion 4 of the weather strip 2 which is opposite the body 8 when the weather strip is mounted. By inserting the weather strip 2 into the gap 22 between the window glass 6 and the body 8 until the projection 24 of the member 23 is engaged with the groove 25 of the leg portion 4, the weather strip 2 is easily placed in a proper position with respect to the window glass 6 and the body 8, wherein the head portion 3 of the weather strip 2 is brought into tight contact with the external surfaces of the vehicle body 8 and of the window glass 6 which is gripped within the holder 5 and the anchor-shaped end 11 of the leg portion 4 is embedded in the bonding agent 21. Alternatively, a member 23′ as shown in FIG. 4 may be used to determine the position of the weather strip 2 with respect to the window glass 6 and the body 8. The member 23′ has a resiliently deformable extension 26 on which a projection 24′ is formed. The mounting of the weather strip 2 in the gap between the vehicle body 8 and the edge of the window glass 6 forces the extension 26 toward the body 8 and securely engages the projection 24′ within the groove 25 of the leg portion 4 of the weather strip 2.

The weather strip or moulding 2 is made of a synthetic resin or metal material having a predetermined stiffness. The holder 5 is made of a synthetic resin or metal material having an elasticity sufficient to force the leg portion 4 of the weather strip 2 toward the body 8.

According to the present invention, the holder 5 serves to urge the leg portion 4 of the weather strip 2 toward the side wall of the body 8 so as to provide a sealing contact therebetween. Accordingly, any clearance between the window glass 6 and the body 8 of the vehicle can be absorbed by the holder 5 and the weather strip 2, so that the weather strip or moulding 2 is easy to manufacture and its manufacturing cost is decreased. Further, the smoothly rounded head portion 3 of the weather strip 2 makes it possible to provide a junction between the window glass 6 and the body 8 which does not make noise when the vehicle is running.

What is claimed is:

1. A weather strip assembly for a window of a vehicle, the window glass being positioned in an opening in the vehicle body so as to leave a gap between at least one edge of the window glass and a wall of the opening, and the window glass being adhered at a portion of its inner surface to the vehicle body by a bonding agent, the bonding agent extending into the lower portion of the gap, the assembly comprising:

(a) a weather strip having a head portion, adapted to overlie a portion of an outer surface of the wall of said opening and a portion of the outer surface of said window glass, and a leg portion integrally formed with said head portion, provided with at least one lateral groove, and having an anchor-shaped lower end, said leg portion being adapted to be inserted in said gap, and said anchor-shaped end being adapted to be embedded in said bonding agent in the lower portion of said gap, and (b) a holder secured to said window glass and having a resilient elongation including a tongue disposed outwardly therefrom toward said groove in said leg portion, said tongue being adapted to engage said groove and said elongation being adapted for urging said leg portion against the wall of said opening when said weather strip is mounted on said vehicle.

2. A weather strip assembly for a vehicle window according to claim 1, wherein said head portion is formed into a hat shape which has a smoothly rounded external surface and said tongue is formed on said elongation of said holder.

3. A weather strip assembly for a vehicle window according to claim 1 further comprising a member secured to said vehicle body and having a raised portion engageable with another groove of said leg portion of said weather strip so as to facilitate a determination of the proper position of said weather strip with respect to said window glass and said body of the vehicle.

4. A weather strip assembly for a vehicle window comprising a weather strip having a head portion adapted to overlay a portion of an outer surface of a body of the vehicle and of an outer surface of a window glass held in an opening formed in the vehicle body and a leg portion integrally formed with said head portion and having an anchor-shaped end, said leg portion being adapted to be inserted into a gap between side edges of said opening and of said window glass and said anchor-shaped end thereof being adapted to be embedded in a bonding agent put into a space between said window glass and said vehicle body, a holder secured to said window glass and having a resilient elongation engageable with said leg portion of said weather strip, and a member secured to said vehicle body and having a raised portion engageable with a first groove of said leg portion of said weather strip so as to facilitate the determination of the proper position of said weather strip with respect to said window glass and said body of the vehicle, said leg portion being provided at a surface facing said window glass with at least one second groove and said holder being provided with a tongue disposed toward said second groove, so as to engage said second groove and force said leg portion toward said body of the vehicle due to the resilience of said elongation when said weather strip is mounted on said vehicle.

5. A weather strip assembly for a vehicle window according to claim 4, wherein said head portion is formed into a hat shape which has a smoothly rounded external surface and said tongue is formed on said elongation of said holder.

* * * * *